(12) United States Patent
Sakai

(10) Patent No.: US 7,600,910 B2
(45) Date of Patent: Oct. 13, 2009

(54) ILLUMINATION DEVICE, LIQUID CRYSTAL DEVICE, AND ELECTRONIC APPARATUS

(75) Inventor: Toyohiro Sakai, Azumino (JP)

(73) Assignee: Epson Imaging Devices Corporation (JP)

( * ) Notice: Subject to any disclaimer, the term of this patent is extended or adjusted under 35 U.S.C. 154(b) by 54 days.

(21) Appl. No.: 11/738,072

(22) Filed: Apr. 20, 2007

(65) Prior Publication Data

US 2007/0279944 A1   Dec. 6, 2007

(30) Foreign Application Priority Data

Jun. 5, 2006   (JP)   ............... 2006-155781
Feb. 2, 2007   (JP)   ............... 2007-023802

(51) Int. Cl.
*F21V 7/04* (2006.01)
(52) U.S. Cl. ............ 362/634; 362/612; 362/613; 362/633
(58) Field of Classification Search ............ 362/97, 362/633, 634, 608–615, 621
See application file for complete search history.

(56) References Cited

U.S. PATENT DOCUMENTS 6,642,913 B1 * 11/2003 Kimura et al. ............ 345/84
2005/0073858 A1 * 4/2005 Kim et al. ............ 362/561
2006/0221636 A1 * 10/2006 Ohashi et al. ............ 362/612
2006/0285362 A1 * 12/2006 Cho et al. ............ 362/633
2007/0019419 A1 * 1/2007 Hafuka et al. ............ 362/373
2007/0031097 A1 * 2/2007 Heikenfeld et al. ............ 385/129

FOREIGN PATENT DOCUMENTS

| JP | 06-347782 | 12/1994 |
|---|---|---|
| JP | 8-315621 | 11/1996 |
| JP | 2001-229722 | 8/2001 |
| JP | 2002-109926 | 4/2002 |
| JP | 2003-234008 | 8/2003 |
| JP | 2004-055454 | 2/2004 |
| JP | 2004-196201 | 7/2004 |
| JP | 2005-078832 | 3/2005 |
| JP | 2006-013087 | 1/2006 |
| JP | 2006-064733 | 3/2006 |

* cited by examiner

*Primary Examiner*—Sandra L O'Shea
*Assistant Examiner*—Evan Dzierzynski
(74) *Attorney, Agent, or Firm*—Lowe Hauptman Ham & Berner, LLP

(57) ABSTRACT

An illumination device includes light sources; a light source substrate on which the light sources are mounted; a light guide panel having a light entrance plane to be arranged so as to oppose the light sources on a part of an end surface thereof; and spacers interposed between the end surface of the light guide panel and the light source substrate, wherein the light sources and the light guide panel are kept in a non-contact state by a space formed by the spacers.

13 Claims, 4 Drawing Sheets

ILLUMINATION DEVICE, LIQUID CRYSTAL DEVICE, AND ELECTRONIC APPARATUS

The entire disclosure of Japanese Patent Application Nos. 2006-155781, filed Jun. 5, 2006 and 2007-023802, filed Feb. 2, 2007 are expressly incorporated by reference herein.

BACKGROUND

1. Technical Field

The present invention relates to an illumination device, a liquid crystal device, and an electronic apparatus and, more specifically, to a relative positioning structure between light sources and a light guide panel in an illumination device having the light sources and the light guide panel.

2. Related Art

In general, an illumination device configured to cause light beams emitted from light sources such as LEDs to enter a light entrance plane configured of a part of an end surface of a light guide panel, propagate in the light guide panel, and go out from a light exit plane of the light guide panel is known. Such illumination device is used as a surface illumination device such as a backlight for illuminating a liquid crystal panel.

In the illumination device as described above, since the luminance distribution of illumination light beams on the light exit plane of the light guide panel varies with the gap between the light sources and the light entrance plane of the light guide panel, the gap between the light sources and the light entrance plane of the light guide panel is set by fixing a light source substrate on which the light sources are mounted and the light guide panel to a holding frame formed of synthetic resin or the like respectively. However, in this configuration, since the light sources and the light guide panel are positioned via the holding frames, the gap varies due to the shape errors of the respective members, and hence fluctuations of the luminance and the distribution of the luminance of the light guide panel may be resulted.

Therefore, in the related art, an illumination device in which fluctuations of the luminance and the distribution of the luminance of the light guide panel is reduced by bringing the light sources into abutment with the light entrance plane of the light guide panel is known (for example, see JP-A-2004-55454). There is also a known illumination device in which a spacer is interposed between the light source substrate and the light guide panel, and the light guide panel is urged toward the spacer for positioning (for example, see JP-A-2006-13087).

On the other hand, an illumination device in which a heat conductive resilient sheets are arranged between the end surface of the light guide panel and the light source substrate and between the light source substrate and a heat sink respectively in order to improve heat discharging property from the light sources to the heat sink is known (for example, see JP-A-2006-64733).

However, the aforementioned illumination device in which the light sources are brought into abutment with the light entrance plane has a problem such that the light sources and the light guide plane may be mechanically damaged when the device is subjected to an impact, or the light guide panel may be changed in property due to heat from the light sources. Specifically, in the case of the illumination device to be mounted to an equipment which is used under an environment which is relatively susceptible to an impact as vehicle-mounted equipment, for example, as will be seen in an oscillation test in which a vehicle-mounted environment is assumed, with the structure in which the light sources and the light guide panel can come into contact with each other, the light sources (LEDs) are subjected to a load little by little, and hence cracking occurs in solder at the mounted portion, so that a defective illumination may be resulted.

The illumination device in which the gap between the light sources and the light guide panel is kept by the spacer may suffer from defective mounting of the light sources as in the above-described case since the light source substrate is applied with a stress (an impact) repeatedly from the spacer due to vibrations applied when being mounted to the vehicle.

Furthermore, in the illumination device in which the heat conductive resilient sheets are arranged between the end surface of the light guide panel and the light source substrate and between the light source substrate and the heat sink respectively, since the heat conductive resilient sheets interposed between the light guide panel and the light source substrate has a thickness slightly thicker than the mounting height of the light sources, the light sources and the light guide panel come into and out of abutment with each other repeatedly upon reception of vibrations and impacts, whereby the light source mounted structure may become damaged. In addition, since the heat conductive resilient sheets are arranged on both sides of the light source substrate, it is difficult to set the position of the light source substrate to a high degree of accuracy, and since the position of the light source substrate with respect to the light guide panel are liable to vary according to the amount of the resilient deformation of the heat conductive resilient sheets on the both sides, there arises a problem that fluctuations of the luminance and the distribution of the luminance may occur.

SUMMARY

An advantage of some aspects of the invention is to provide an illumination device in which damage of light sources and a light source substrate due to vibrations or the like is reduced while securing the relative positioning state between the light sources and the light guide panel.

An illumination device according to an aspect of the invention includes light sources, a light source substrate on which the light sources are mounted, a light guide panel having a light entrance plane to be arranged so as to oppose the light sources on a part of an end surface thereof, spacers interposed between the end surface of the light guide panel and the light source substrate, wherein a gap is formed between the light sources and the light guide panel by a space formed by the spacers. The light sources each include a light emitting surface and are mounted to the light source substrate in a posture facing a side opposite from the light emitting surface toward a mounting surface. Light beams emitted from the light sources and entering the light guide plane through the light entrance plane goes out through the light exit plane formed on one of the plane surfaces of the light guide panel. The spacers are resilient spacers, and are interposed between the end surface of the light guide panel on the side of the light sources and a portion of the light source substrate other than an area on which the light sources are mounted. The light guide panel is urged toward an end surface which opposes the end surface on the side of the light sources by a resilient force of the spacers.

According to an aspect of the invention, the light guide panel is urged by the spacers interposed between the light source substrate and the light guide panel, and the light sources and the light guide panel are kept in a non-contact state by the space formed by the spacers, so that a load is hardly applied to the light sources and the light source substrate even when vibrations or an impact is applied. Therefore, the light sources and the light source substrate is prevented form becoming damaged.

Preferably, the light guide panel is positioned and held with respect to a supporting surface which opposes the direction of the resilient force by the resilient force applied to the light guide panel. More specifically, preferably, the supporting surface is provided on a supporting portion which supports the end surface of the light guide panel on the side of the light guide panel opposite from the light sources, and the light guide panel is positioned by being held in a state of abutting against the supporting portion by the resilient force of the spacer. In this configuration, positioning of the light guide panel is achieved by the spacers arranged on the side of the light sources, and the supporting portion arranged on the opposite side thereof. Therefore, the positioning accuracy of the light guide panel is determined by the positioning accuracy of the supporting portion, and hence the position of the light guide panel and the gap between the light sources and the light guide panel are set at a high degree of accuracy. Since it is no longer necessary to provide a complex positioning structure by providing the supporting portion on the opposite side of the light guide panel, downsizing and cost reduction of the device are achieved. The supporting portion is preferably provided in a holding frame for holding the light source substrate and the light guide panel.

It is preferable that the light source substrate and the light guide panel are kept in a contact state via the spacers. In this configuration, the light source substrate and the light guide panel are kept in the contact state via the spacers, the relative positioning between the light source substrate and the light guide panel is stabilized, and the reproducibility of the state of outgoing light from the light guide panel is secured.

It is preferable that a holding frame for holding the light source substrate and the light guide panel is further provided and the light guide panel is positioned and held by being urged toward a side opposing the side of the holding frame on which the light sources are arranged by the spacers. In this configuration, since the light guide panel is held at a position by being urged toward the holding frame by the spacers, the positional relation between the light source substrate and the light guide panel is accurately set, and the positioning structure is easily configured.

In this case, it is preferable that the spacers are configured integrally with the holding frame. In this configuration, since the spacers are configured integrally with the holding frame, the number of components is further reduced, and hence further downsizing and cost reduction are achieved.

It is preferable that the holding frame includes an inwardly overhanging portion overhanging from the holding portion on the side of the light source substrate over the light exit plane of the light guide panel, and the spacers have a structure directly connected to the inwardly overhanging portion. In this configuration, through the provision of the inwardly overhanging portion overhanging from the holding portion on the side of the light source substrate over the light exit plane of the light guide panel on the holding frame, an area of the light guide panel near the light sources in which fluctuation in luminance is relatively large is coated and hence the uniformity in luminance is enhanced, and by connecting the spacers directly to the inwardly overhanging portion, the spacers is reliably integrated with the holding frame without problem.

It is preferable that mounting joint members for conductively connecting the light sources and the light source substrate are provided and the resilient spacers do not come into contact with the mounting joint members. When the mounting joint members for conductively connecting the light sources and the light source substrate come into abutment with the spacers, the resilient force of the spacers may be uneven, or defects may occur in the mounting structure due to vibrations or impacts applied via the spacers. However, with the configuration shown above, the stability of the resilient force is secured, and occurrence of the mounting defect caused by contact with respect to the spacer is prevented.

According to an aspect of the invention, a reflection member for reflecting light beams from the light sources toward the end surface is arranged between the light sources and the end surface of the light guide panel. When a space is provided between the light source substrate and the entrance plane of the light guide plane for keeping the light sources and the light guide panel in a non-contact state, there arises a new problem that the efficiency for light utilization is lowered due to leakage of light from the space or absorption of light by a casing or the like. According to the configuration in the embodiment of the invention, since light beams emitted from the light sources is reflected toward the end surface of the light guide panel by the reflecting member arranged in the space, even with the configuration in which the space is provided between the light source substrate and the entrance plane of the light guide panel, light beams from the light sources may be used without incurring waste. More specifically, by extending the reflecting plate disposed on the opposite side from the light emitting surface of the light guide panel up to the mounting substrate for use, the reflecting member having a good reflecting property is easily obtained. By forming a reflecting layer on a light source mounting surface of the light source mounting substrate and uses as the light reflecting surface, and bending the same toward the light guide panel, the reflecting member is arranged in the space. In addition, by providing the reflecting characteristic to side surfaces of the spacers, that is, the surfaces of the spacers that do not come in contact with the end surface of the light guide panel and the light source substrate, the more quantity of light beams enter the end surface of the light guide panel. The reflecting characteristic may be provided to the spacers by machining the side surfaces of the spacers, and the reflecting power is also secured by selecting silicone rubber material or urethane rubber material of whitish color or transparent resin having a relatively high refractive index. That is, what is essential is that the light reflecting power of the side surfaces of the spacers is larger than the light absorption coefficient.

An liquid crystal device according to an aspect of the invention includes any one of the illumination devices shown above, and a liquid crystal panel using illumination light beams from the illumination device as at least part of the display light. In this configuration, since the liquid crystal panel may be illuminated with the illumination device in which the probability of occurrence of defects due to vibrations or impacts is reduced, reliability of the liquid crystal device is improved. In addition, an electronic apparatus according to an aspect of the invention includes the liquid crystal device shown above mounted thereon. The electronic apparatus according to the aspect of the invention is used, for example, in television receivers, video monitors, mobile computer apparatus, mobile phones, and electronic watch, and more preferably, it is preferably used, for example, in vehicle-mounted television receivers, vehicle-mounted monitors, vehicle-mounted navigation systems, and various vehicle-mounted meters.

BRIEF DESCRIPTION OF THE DRAWINGS

The invention will be described with reference to the accompanying drawings, wherein like numbers reference like elements.

DESCRIPTION OF EXEMPLARY EMBODIMENTS

Illumination Device

Figure 1:
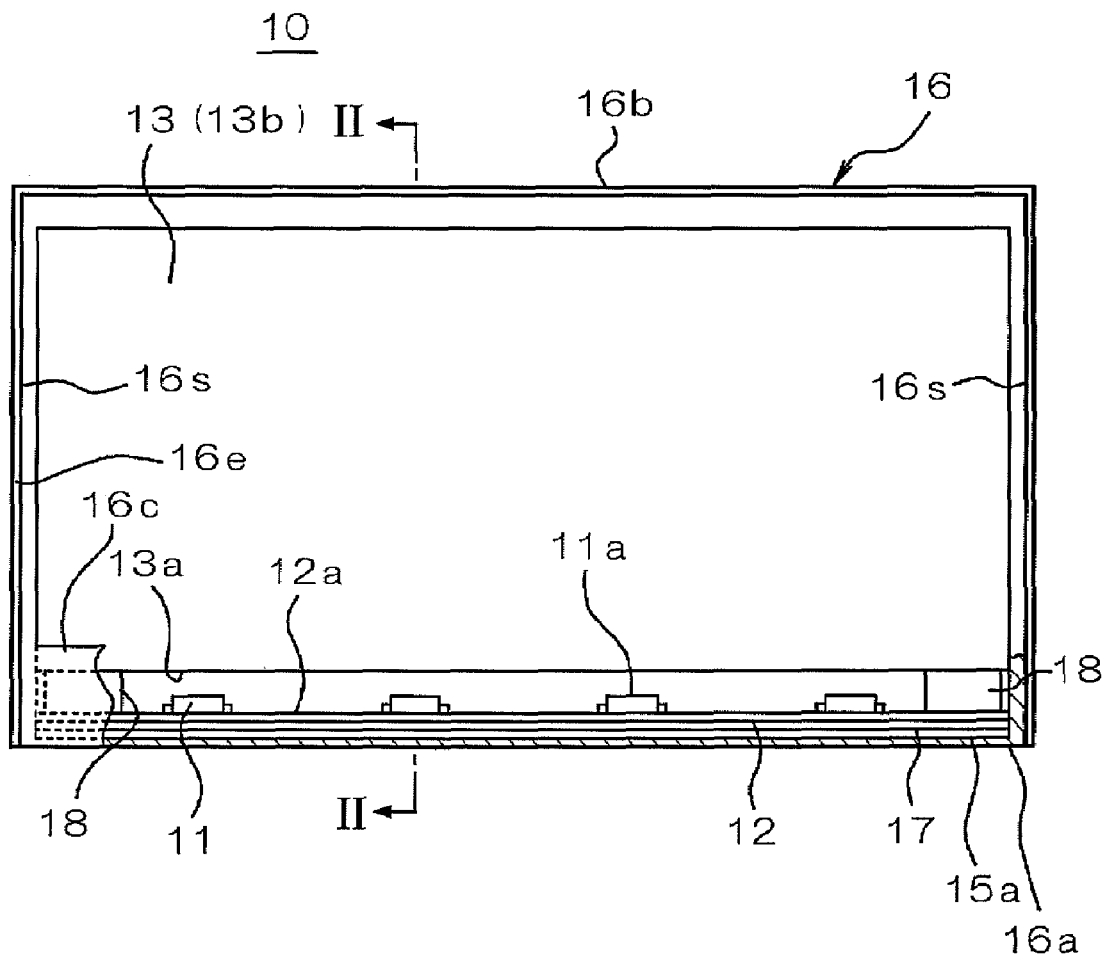
FIG. 1 is a schematic plan view of an illumination device in an embodiment.
Figure 2:
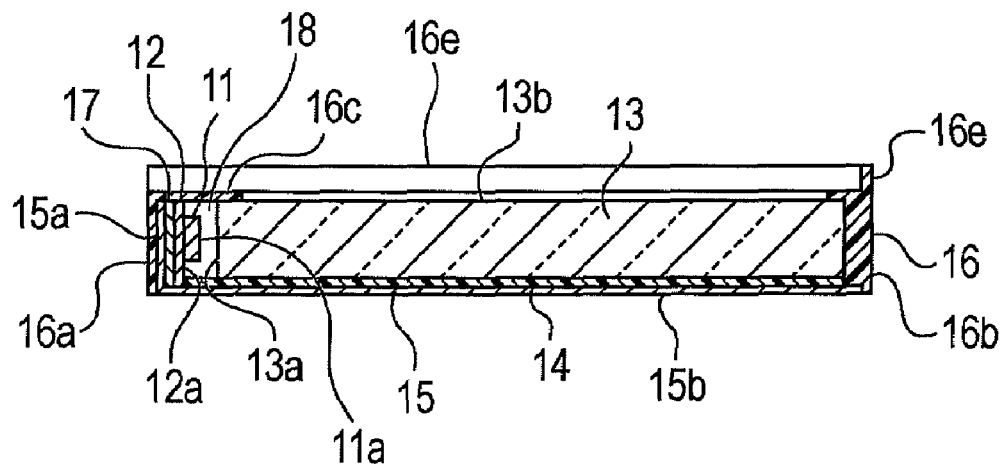
FIG. 2 is a schematic vertical cross-sectional view showing a cross section taken along the line II-II in FIG. 1.

Referring now to the attached drawings, embodiments of the invention will be described in detail. FIG. 1 is a schematic plan view showing the entire structure of an illumination device 10 in this embodiment. FIG. 2 is a schematic vertical cross-sectional view showing a cross section taken along the line II-II in FIG. 11. In the attached drawings, the dimensions of the respective components, the ratio between the length and the thickness, and the ratio of other components are changed as needed for the sake of convenience of illustration, and do not show actual dimensions or ratio.

The illumination device 10 in this embodiment includes a plurality of light sources 11, a light source substrate 12 having the light sources 11 mounted thereon, a light guide panel 13 having an end surface (light entrance plane) 13a opposing the light sources 11, and a light reflection sheet 14 arranged under the bottom surface of the light guide panel 13. The light sources 11 are composed of LEDs (light emitting diodes), and in the case of an example shown in the drawing, have a form of surface mounted LED chips encapsulated with resin (parallelepiped shape). A light source substrate 12 is formed with a wiring pattern, not shown, and terminals formed on a mounting surface 12a are conductively connected to terminals of the light sources 11 via mounting joint members 11x. The light sources 11 each include a light emitting surface 11a, and are mounted to the light source substrate 12 in a posture facing the side opposite from the light emitting surface 11a toward the mounting surface 12a. That is, in this embodiment, an optical axis of the light emitting surface 11a is substantially orthogonal to the mounting surface 12a of the light source substrate 12.

A portion of the mounting surface 12a which is not covered at least with the light sources 11 is coated with a light reflecting layer (not shown) such as white printed layer or a resin film to form a light reflecting surface. The light reflecting layer is preferably formed, for example, of silk printing (screen printing). Although the light source substrate 12 may be configured with various materials, it is generally configured with a flexible substrate formed mainly of synthetic resin such as polyimide resin. However, in order to alleviate increase in temperature of the light sources caused by heat generated in the light sources 11, it is preferably includes base material composed of metal such as aluminum or copper. When a configuration in which the light source substrate 12 having the mounting surface 12a coated with the light reflecting layer is bent so that an end portion thereof is overlapped with an end portion of the light guide panel 13 (not shown) is employed, it is possible to cause the light source substrate 12 to function as a reflection panel between the light source substrate 12 and the light guide panel 13.

The back face of the light source substrate 12 (the rear face of the mounting surface 12a) is supported by a heat discharging chassis 15 formed of or aluminum or the like via a tape or a sheet having a good heat conductivity or a soft heat conducting material 17 such as radiating grease. The light source substrate 12 may be brought into abutment with the radiating chassis 15 directly without the intermediary of the heat conducting material 17. The radiating chassis 15 includes a bent end 15a arranged behind the light source substrate 12 and a plate supporting portion 15b arranged under the light guide panel 13 and the light reflection sheet 14. The light source substrate 12 is positioned in a holding frame 16, described later, indirectly via the heat conducting material 17 and the bent end 15a.

The light guide panel 13 is formed of transparent material such as acrylic resin or polycarbonate resin, and is formed into a plate shape as a whole. In the example shown in the drawing, the light guide panel 13 is formed into a rectangular shape in plan view, and has four end surfaces therearound. One end surface from among these end surfaces corresponds to the light entrance plane 13a. Although the light entrance plane 13a is a flat plane in the example shown in the drawing, it is possible to provide a recess on the light entrance plane 13a or provide a prism structure considering a radiating characteristic of the light sources 11 and a light propagating characteristic of the light guide panel 13.

The light guide panel 13 is provided with a light deflecting device (not shown) for deflecting light entering through the light entrance plane 13a toward a light exit plane 13b which corresponds to a panel surface on the front side. The light deflecting device is composed, for example, of a prism structure or a light scattering printed layer formed on the bottom surface of the light guide panel 13. The light deflection device is formed to have an adequate distribution density so that the luminance of the light exit plane 13b is unifommized (for example, a mode of distribution changing gradually from dense to rough from the light sources 11 side).

Interposed between the end surface (light entrance plane) 13a of the light guide panel 13 and the mounting surface 12a of the light source substrate 12 are resilient spacers 18. The resilient spacers 18 is formed of various resilient members including rubber material such as silicone rubber or urethane rubber, or relatively hard material (such as metal or resin) thinned to achieve resilient deformation (various spring members). The resilient spacers 18 are in a state of being resiliently compressed, and press the light guide panel 13 in the direction away from the light sources 11 and the light source substrate 12 by its resiliently restoring force. Materials for the resilient spacers 18 preferably have good heat conductivity. The resilient spacers 18 preferably have a desirable reflecting power on side surfaces.

The light reflection sheet 14 is arranged under the bottom surface of the light guide panel 13 so as to be aligned in contact with each other, so that the light beams coming out from the bottom surface of the light guide panel 13 is returned into the light guide panel 13. The light reflection sheet 14 is a resin sheet such as white polyethylene. The light reflection sheet 14 is arranged so as to extend to the light source substrate 12, so that light beams from the light sources 11 are reflected in a space between the light guide panel 13 and the light source substrate 12 toward the light entrance plane 13a of the light panel 13.

The light guide panel 13 is held basically in the interior of the holding frame 16. The holding frame 16 is formed of light reflecting material such as white polyethylene, and is formed into a rectangular frame shape so as to surround the light guide panel 13 in plan view. The holding frame 16 is formed into a frame shape including a light-source-side wall portion 16a arranged on the outside of the light source substrate 12 (more specifically, the outside of the bent end 15a of the radiating chassis 15), an opposite side wall portion 16b arranged on the opposite side with the intermediary of the light guide panel 13 so as to oppose the light-source-side wall portion 16a, and left and right side wall portions 16s connecting the light-source-side wall portion 16a and the opposite side wall portion 16b.

The light guide panel 13 is positioned and held in a state of being pressed against the opposite side wall portion 16b of the holding frame 16 by the resilient force of the resilient spacers 18. That is, the inner surface of the opposite side wall portion 16b serves as a supporting surface opposing the direction of the resilient force of the resilient spacers 18. In general, the light guide panel 13 must simply be in a state of receiving the resilient force from the resilient spacers 18 on the side of the light sources 11, and positioned and held between the resilient spacers 18 and the supporting surface opposing the direction of the resilient force of the resilient spacers 18. Therefore, the supporting surface opposing the direction of the resilient force of the resilient spacers 18 is not limited to the inner surface of the opposite side wall portion 16b and, for example, it may be side surfaces of projections provided on the inner surfaces of the side wall portions 16s which are configured to fit recessed grooves formed on the side end surfaces of the light guide panel 13. The supporting surface does not necessarily have to be an inner surface which is orthogonal to the direction of the resilient force of the resilient spacers 18 as in the example shown in the drawing, and may be, for example, a surface inclined with respect to the aforementioned direction.

In the state of positioning as described above, the light source 11 is kept out of contact with the end surface (light entrance plane) 13a of the light guide panel 13 by a space secured by interposing the resilient spacers 18 between the light source substrate 12 and the light guide panel 13. Preferably, the gap between the light emitting surface 11a of the light sources 11 and the light entrance plane 13a of the light guide panel 13 is in a range from 0.2 mm to 5 mm. When the gap is smaller than 0.2 mm, the actual gap may become too small due to fluctuation of the mounting height of the light sources 11, and hence there arises a probability that the light sources 11 come into contact with the light entrance plane 13a due to vibrations or impacts. When the gap exceeds 5 mm, there arise disadvantages such that the percentage of the incident light entering the light guide panel 13 is lowered, or the planer dimensions of the apparatus increases.

An inwardly overhanging portion 16c configured to overhang from the light-source-side wall portion 16a, the opposite side wall portion 16b, and the side wall portions 16s respectively toward the inner sides (toward the light guide panel) extends so as to protrude over the light exit plane 13b of the light guide panel 13. The overhanging amount of the inwardly overhanging portion 16c of a part especially from the light-source-side wall portion 16a is large, so that the portion near the light entrance plane 13a opposing the light sources 11 is covered to prevent generation of eyeball-shaped high-luminance spots in areas on the light exit plane 13b near the light entrance plane 13a described above.

At least part of the holding frame 16 formed into a frame shape by the light-source-side wall portion 16a, the opposite side wall portion 16b, and the left and right side wall portions 16s, that is, the opposite side wall portion 16b and the left and right side wall portions 16s in the example shown in the drawing are provided with extended holding portion 16e provided so as to protrude from the inwardly overhanging portion 16c toward the light exit side (upward in the drawing). The extended holding portion 16e is a structure for positioning and holding a liquid crystal panel, described later.

In this embodiment, the light guide panel 13 is positioned by being pressed by the resilient spacers 18 in the direction away from the light source substrate 12, and held in a state of abutting against the opposite side wall portion 16b of the holding frame 16. Then, in this state, the light sources 11 do not come into contact with the light entrance plane 13a. Therefore, since the position of the light guide panel 13 is determined by the dimensions of the holding frame 16, the space formed from the light sources 11 and the light source substrate 12 to the light guide panel 13 is reliably secured as long as the resilient spacers 18 demonstrate the resilient force. In this case, since the positioning structure of the light guide panel 13 is sufficient as long as there exists the opposite side wall portion 16b as the supporting member, an extremely simple structure is achieved and, in addition, since the number of components may be reduced, downsizing and cost reduction of the illumination device 10 are achieved.

Since the resilient spacers 18 are interposed between the light source substrate 12 and the light guide panel 13 in an compressed state, even though vibrations or impacts are applied from the outside, the stress is alleviated by the resilient force of the resilient spacers 18, and rattles may be prevented. Therefore, the light sources 11, the light source substrate 12, and the light guide panel 13 are prevented from becoming damaged.

In this case, since mounting joint members (soldered portion) 11x which constitutes conductive connections between the light sources 11 and the light source substrate 12 are configured no to come into contact with the resilient spacers 18, probabilities that the resiliently restoring force which the resilient spacers 18 apply to the light guide panel 13 when coming into contact with the mounting joint member 11x becomes uneven and that the mounting joint portion is damaged due to the contact of the resilient spacer 18 and hence the defective mount is resulted may be avoided.

Figure 3:
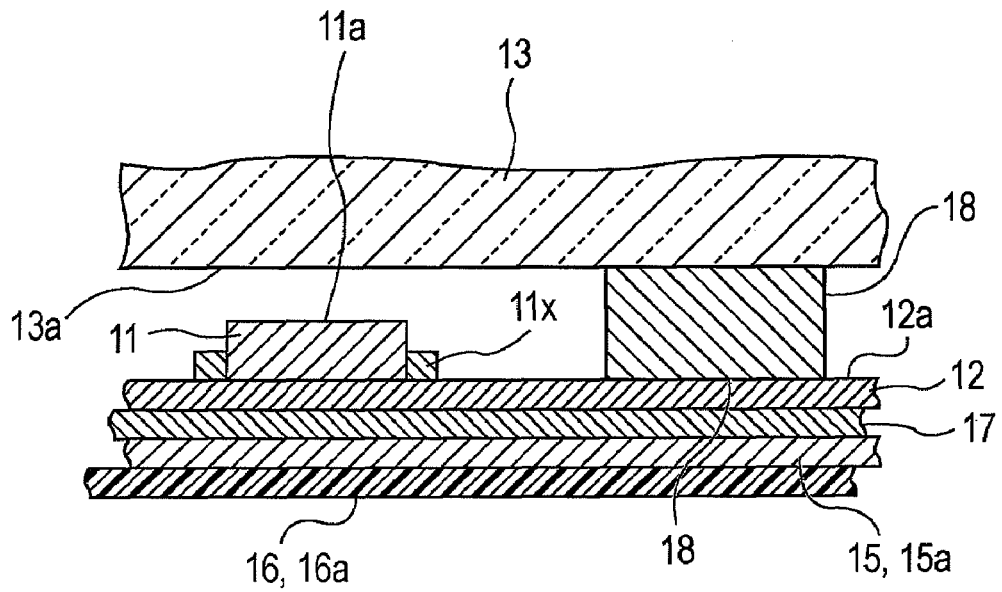
FIG. 3 is a partial lateral cross-sectional view showing a portion near the light source in an enlarged scale.

FIG. 3 is a partial cross-sectional side view showing a portion near the light source in an enlarged scale. In this embodiment, since the radiating chassis 15 is in contact with the back side of the light source substrate 12 via the soft heat conducting material 17, the substantial thermal contact surface area between the light source substrate 12 and the radiating chassis 15 is increased, whereby heat from the light source substrate 12 may be conducted efficiently to the radiating chassis 15. In this embodiment, since the resilient spacers 18 are in abutment with the end surface of the light guide panel 13 as described above, the heat of the light source substrate 12 is radiated to the light guide panel 13. Therefore, the heat generated from the light sources 11 is efficiently radiated via the light source substrate 12, and hence the temperature of the light sources 11 is lowered, whereby fluctuation of luminance of the light sources 11 is reduced, and the progression of deterioration of the luminance may be delayed.

In a case of the structure in which a plurality of light sources 11 are aligned as in the example shown in the drawing, since deviation of the distribution of the temperature generated along the direction of alignment of the light sources 11 may be alleviated by improving the heat radiating property as described above, fluctuations in luminance and chromaticity among the light sources 11 is reduced. For example, when a plurality of the light sources 11 are aligned, in general, the temperature at the center of the row of the light sources 11 is high, and the temperature at the ends of the row of the light source 11 is low. However, when the heat radiating property is improved, the temperature difference between the center and the ends of the row of the light sources 11 is reduced, and hence fluctuations in luminance and chromaticity are also alleviated. In particular, when the light sources 11 integrally including R light-emitters composed of red LEDs, G light-emitters composed of green LEDs, and B light emitters composed of blue LEDs are used, the temperature dependency of the respective LEDs increases (for example, the blue LEDs increase in luminance with temperature increase, while the red LEDs and the green LEDs decrease in luminance with the temperature increase). Therefore, when there is a difference in environment temperatures, the chromaticity varies significantly. However, in this embodiment, fluctuations in chromaticity are reduced by the reduction of the temperature difference.

Since the light guide panel 13 in this embodiment is configured to be urged by the resilient spacers 18 in the direction opposite from the light sources 11, and pressed against and held by the holding frame 16, it is no longer necessary to provide engaging projection or the like for positioning the light guide panel 13 in the holding frame 16. Therefore, width reduction of the holding frame 16, that is, thinning of the side wall portions 16s is achieved, so that the illumination device 10 is downsized into a flat shape, and the reduction of the height of the frame (reduction of the width of the overhung portion of the portion overhanging outward from the illuminating range) is achieved.

Figure 4:
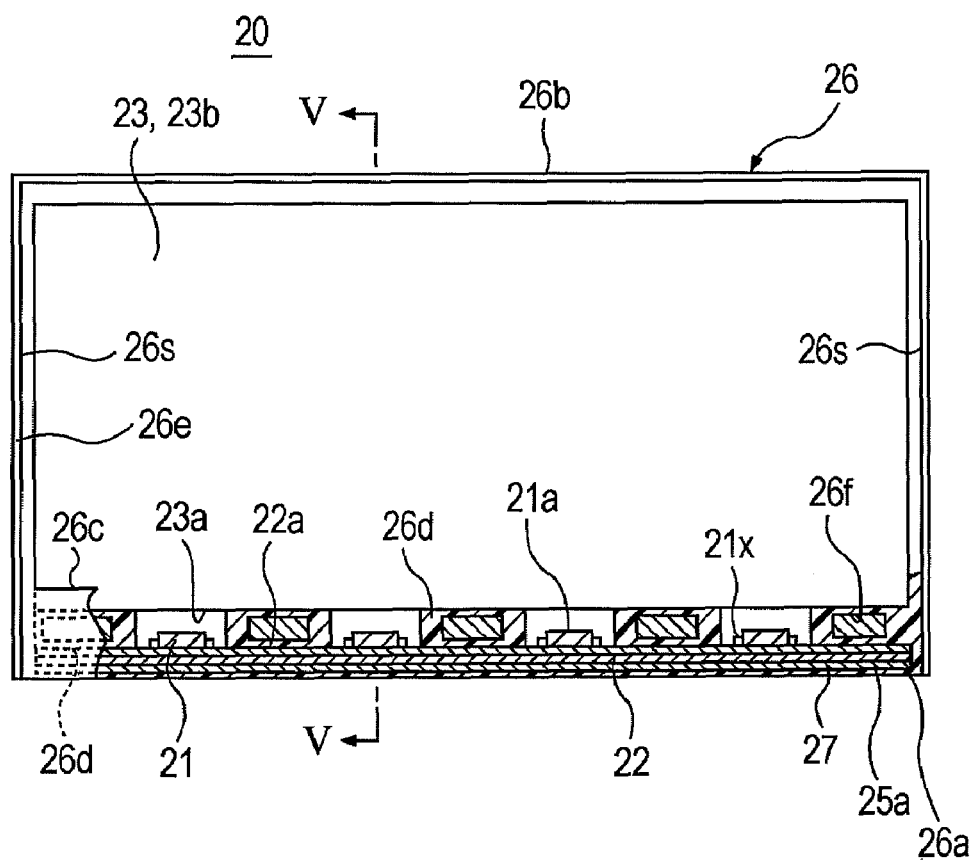
FIG. 4 is a schematic vertical cross-sectional view showing a illumination device according to another embodiment different from the above-described embodiment.
Figure 5:
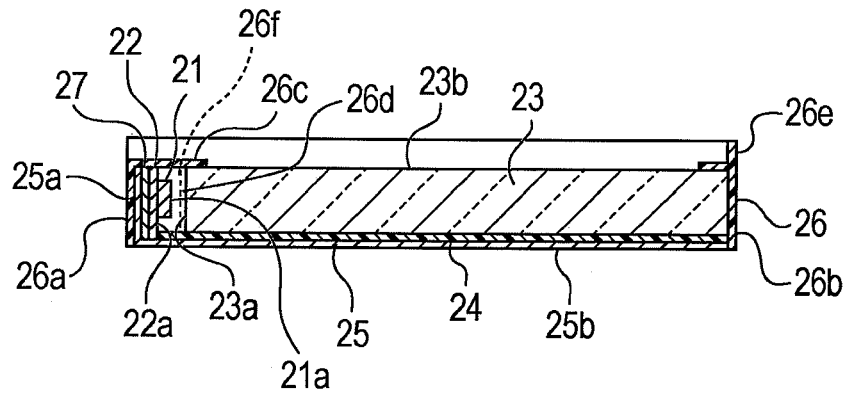
FIG. 5 is a schematic vertical cross-sectional view showing a cross section taken along the line V-V in FIG. 1.

FIG. 4 is a schematic vertical cross-sectional view showing another embodiment different from the above-described embodiment, and FIG. 5 is a schematic vertical cross-sectional view showing a cross section taken along the line V-V in FIG. 4. In FIG. 4 and FIG. 5, the same parts as in the above-described embodiment are represented by the same reference numerals, and description will not be given. In an illumination device 20 in this embodiment, light sources 21 each provided with a light radiating surface 21a, a light source substrate 22 provided with a mounting surface 22a, a light guide panel 23 provided with a light entrance plane 23a and a light exit plane 23b, a light reflection sheet 24, a radiation chassis 25 having a bent end 25a and a plate-shaped supporting portion 25b, and a heat conducting member 27 are configured in the same manner as the above-described embodiment. On the other hand, the resilient spacers 18 and the holding frame 26 are different from the embodiment described above, and hence will be described below.

In the illumination device 20 in this embodiment, resilient spacers 26d which correspond to the resilient spacers 18 are formed integrally with a holding frame 26. The holding frame 26 has a light-source-side wall portion 26a as that described above and an inwardly overhanging portion 26c overhanging from the light-source-side wall portion 26a over the light exit plane 23b of the light guide panel 23. The resilient spacers 26d are connected directly to the inwardly overhanging portion 26c and extending downward from the inwardly overhanging portion 26c, thereby being arranged between the light source substrate 22 and the light guide panel 23. The resilient spacers 26d each formed with a through hole 26f, and are resilient deformable at least in the direction from the light source substrate 22 toward the light guide panel 23 by the through holes 26f. That is, in this embodiment, although the resilient spacers 26d are formed integrally with the holding frame 26, the above-described resilient characteristic is achieved by the structure (thinned structure having the through hole 26f).

The structure of the resilient spacer 26d is not limited to the structure shown in the drawing, and a structure in which the through hole 26f is elongated in the widthwise direction (horizontal direction in FIG. 4) and the portion on the side of the light source substrate 12 and the portion on the light guide panel 13 are completely separated. In this case, the respective portions are cantilevered by the inwardly overhanging portion 26c, so that the resilient deformation in the same direction is achieved.

In this embodiment, an opposite side wall portion 26b, side wall portions 26s, and an extended holding portion 26e are configured in the same manner as the above-described embodiment.

Liquid Crystal Device

Figure 6:
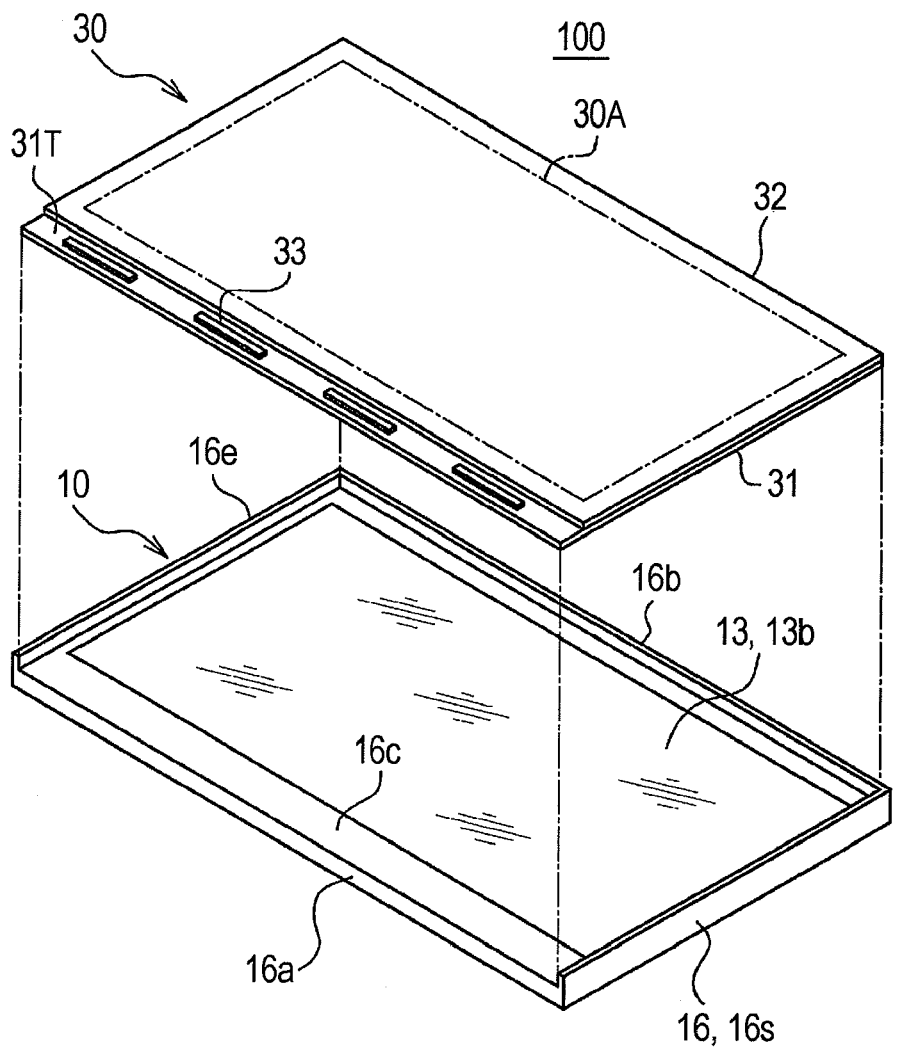
FIG. 6 is an exploded perspective view of a liquid crystal device.

Referring now to FIG. 6, an embodiment of a liquid crystal device according to an aspect of the invention will be described. A liquid crystal device 100 includes the illumination device 10, and a liquid crystal panel 30 using illumination light beams outgoing from a light exit plane 12b of the illumination device 10. It is also possible to employ the illumination device 20 instead of the illumination device 10. In the example shown in the drawing, the liquid crystal panel 30 is arranged on the front side (observing side) of the illumination device 10 so as to be aligned in contact with each other, and is configured to use at least part of illumination light beams of the illumination device 10 coming from the back side as display light.

The liquid crystal panel 30 is a liquid crystal display panel having transparent substrates 31 and 32 formed of, for example, glass or plastic adhered to each other via a sealing member, not shown, and liquid crystal, not shown, encapsulated in an area therebetween surrounded by the sealing member. As described above, since the illumination device 10 is used as the backlight, the liquid crystal panel 30 is a transmissive or transflective display panel. Adequate wirings and electrode structures are formed respectively on the inner surfaces of the substrates 31 and 32, and pixels having the liquid crystal arranged between the electrodes opposing to each other are arranged laterally and vertically in a matrix pattern to configure a display area 30A. The substrate 31 is provided with a substrate protruding portion 31T protruding outward from the outline of the substrate 32, and wirings, not shown, are drawn out onto the surface of the substrate protruding portion 31T and integrated circuit chips 33 which configures a drive circuit are mounted in areas where the wirings are drawn out. The integrated circuit chips 33 drive pixels in the display area 30A by adequate drive signals via the wirings or the like on the basis of control signals or data signals entered from the outside to control the light transmittance of the respective pixels.

The liquid crystal panel 30 is arranged inside the extended holding portion 16e of the holding frame 16 in such posture that the substrate protruding portion 31T is arranged on the inwardly overhanging portion 16c of the holding frame 16 which covers the upper side of the light sources 11. In this configuration, the illumination device 10 and the liquid crystal panel 30 are positioned in the direction of a plane, and the both are integrally fixed by using an adequate fixing device such as double-faced tape. The planer dimensions of the entire device may be reduced by arranging the substrate protruding portion 31T on the upper side of the light sources 11.

Electronic Apparatus

Figure 7:
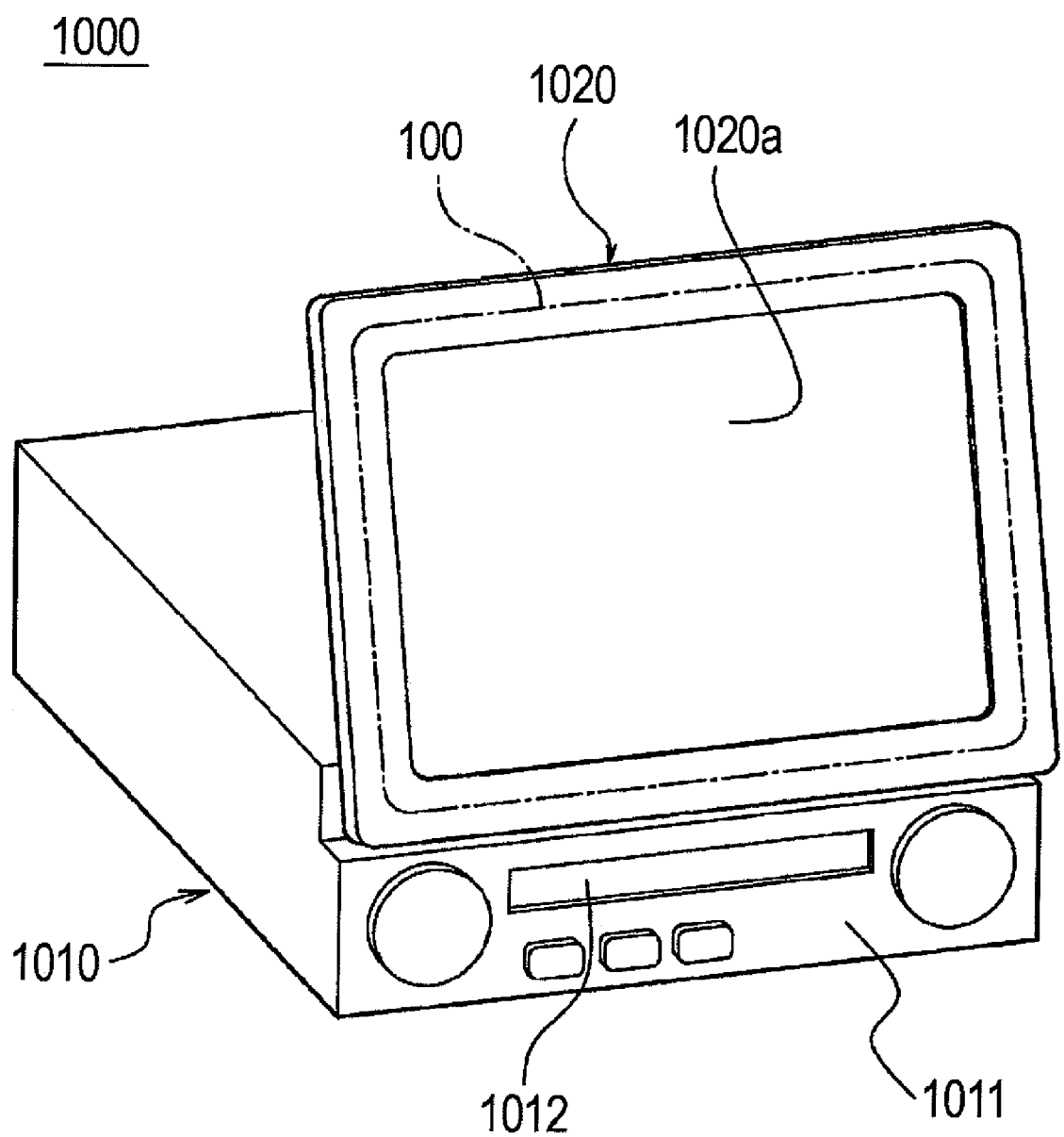
FIG. 7 is a schematic perspective view of an electronic apparatus.

Referring to FIG. 7, an embodiment of an electronic apparatus in which the liquid crystal device is mounted will be described. FIG. 7 is a schematic perspective view showing an appearance of an example of the electronic apparatus according to the embodiment of the invention. An electronic apparatus 1000 shown in the drawing is a vehicle-mounted car navigation system, and includes a main body 1010 and a display unit 1020 connected to the main body 1010. The main body 1010 has an operating surface 1011 on which operating buttons are arranged, and is provided with an insertion port 1012 for a recording medium such as a DVD. The liquid crystal device 100 described above is stored in the interior of the display unit 1020, so that the display by the liquid crystal device 100, that is, the display of navigation images is visible on the display screen 1020a of the display unit 1020.

In the electronic apparatus 1000, since the fluctuations in luminance of display light coming out from the display screen and the distribution thereof are reduced because the liquid crystal device 100 shown above is mounted, a high display quality is realized. A highly reliable apparatus which does not suffer from defects of the light sources even by vibrations of the vehicle is configured.

The illumination device, the liquid crystal device, and the electronic apparatus according to an aspect of the invention are not limited to the aforementioned examples shown in the drawings, and various modifications may be made without departing from the scope of the invention as a matter of course. For example, the illumination device is not limited to the one mounted to the liquid crystal device as described above, and may be used as an independent lighting device, or may be used integrally with other various devices other than the liquid crystal device.

What is claimed is:

1. An illumination device comprising: light sources; a light source substrate on which the light sources are mounted; a light guide panel having opposite major surfaces and a side face connecting said major surfaces, said side face defining a light entrance plane facing the light sources, one of said major surfaces defining a light exiting plane from which light emitted by the light sources and entering the light guide panel via the light entrance plane exits the light guide panel; and
    spacers interposed between the side face of the light guide panel and the light source substrate, wherein a gap is formed between the light sources and the side face of the light guide panel by the spacers; and a holding frame having a first side wall portion holding the light source substrate and a second side wall portion holding the light guide panel, wherein the light guide panel is positioned and held by being resiliently urged arranged by the spacers toward a third side wall portion of the holding frame that is opposite to the first side wall portion.

2. The illumination device according to claim 1, wherein the spacers are positioned between the light source substrate and the light guide panel.

3. The illumination device according to claim 1, wherein the spacers are configured integrally with the holding frame.

4. The illumination device according to claim 1, wherein the holding frame further comprises an inwardly overhanging portion projecting from said first side wall portion and overlaying the light guide panel, and
    the spacers comprise a portion directly contacted with the inwardly overhanging portion.

5. The illumination device according to claim 1, further comprising:
    mounting joint members conductively connected to the light sources and the light source substrate, wherein the spacers are free of direct contact with the mounting joint members.

6. The illumination device according to claim 1, further comprising:
    a reflection member for reflecting light beams from the light source substrate toward the side face of the light guide panel that defines the light entrance plane.

7. The illumination device according to claim 6, further comprising:
    a reflecting plate positioned under the light guide panel for reflecting light beams from the other of the major surfaces of the light guide panel toward the light exiting plane;
    wherein the reflecting member is an extension of the reflecting plate.

8. A liquid crystal device, comprising:
    the illumination device according to claim 1, and
    a liquid crystal panel for using illumination light beams from the illumination device as at least a part of display light.

9. An electronic apparatus comprising the liquid crystal device according to claim 8.

10. The illumination device according to claim 1, wherein the light sources each comprises a light emitting surface, which is spaced from the light entrance plane in a range from 0.2 mm to 5 mm.

11. The illumination device according to claim 1, further comprising:
    a heat discharging member supporting the light source substrate and the light guide panel; and
    a heat conducting element sandwiched between the heat discharging member and the light source substrate to radiate heat away from the light source substrate.

12. The illumination device according to claim 1, wherein the spacers each comprises through holes, which render said spacers resiliently deformable at least in a direction from the light source substrate toward the light guide panel.

13. An illumination device comprising: light sources; a light source substrate on which the light sources are mounted; a light guide panel having opposite major surfaces and a side face connecting said major surfaces, said side face defining a light entrance plane facing the light sources, one of said major surfaces defining a light exiting plane from which light emitted by the light sources and entering the light guide panel via the light entrance plane exits the light guide panel; and
    spacers interposed between the side face of the light guide panel and the light source substrate, wherein a gap is formed between the light sources and the side face of the light guide panel by the spacers;
    wherein the spacers are made from a resilient member, and the device having a holding frame having a first side wall portion holding the light source substrate and a second side wall portion holding the light guide panel,
    wherein the light source substrate is resiliently urged by the spacers against the first side wall portion of the holding frame.

* * * * *